(12) United States Patent
Xu et al.

(10) Patent No.: US 11,949,128 B2
(45) Date of Patent: Apr. 2, 2024

(54) CURRENT COLLECTING MEMBER, SECONDARY BATTERY AND FABRICATION METHOD

(71) Applicant: CONTEMPORARY AMPEREX TECHNOLOGY CO., LIMITED, Ningde (CN)

(72) Inventors: Hu Xu, Ningde (CN); Miaomiao Ren, Ningde (CN); Yuanbao Chen, Ningde (CN); Long Xu, Ningde (CN); Donglai Zheng, Ningde (CN); Lingbo Zhu, Ningde (CN); Yongshou Lin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 346 days.

(21) Appl. No.: 17/317,854

(22) Filed: May 11, 2021

(65) Prior Publication Data

US 2021/0265709 A1    Aug. 26, 2021

Related U.S. Application Data

(63) Continuation of application No. PCT/CN2019/119736, filed on Nov. 20, 2019.

(30) Foreign Application Priority Data

Nov. 22, 2018   (CN) .......................... 201821940481.4

(51) Int. Cl.
*H01M 50/54* (2021.01)
*H01M 50/50* (2021.01)
*H01M 50/564* (2021.01)

(52) U.S. Cl.
CPC ........... *H01M 50/54* (2021.01); *H01M 50/50* (2021.01); *H01M 50/564* (2021.01)

(58) Field of Classification Search
CPC ..... H01M 50/54; H01M 50/50; H01M 50/564
(Continued)

(56) References Cited

U.S. PATENT DOCUMENTS 8,822,065 B2   9/2014   Byun et al.
9,123,947 B2   9/2015   Lee et al.
(Continued)

FOREIGN PATENT DOCUMENTS

CN   101834305 A   9/2010
CN   106299449 A   1/2017
(Continued)

OTHER PUBLICATIONS

Contemporary Amperex Technology Co., Limited, Extended European Search Report, PCT/CN2019119736, dated Oct. 19, 2021, 9 pgs.
(Continued)

*Primary Examiner* — Jonathan G Jelsma
*Assistant Examiner* — Omar M Kekia
(74) *Attorney, Agent, or Firm* — Kilpatrick Townsend & Stockton LLP (57) ABSTRACT

This application provides a current collecting member, a secondary battery, and a fabrication method. The secondary battery includes an electrode assembly, a housing, a top cover assembly and current collecting members. The electrode assembly includes a main body portion and a first tab extending from an end of the main body portion along a transverse direction. The top cover assembly includes a top cover plate and a first electrode terminal disposed on the top cover plate connected to the housing. The current collecting member is connected to the first tab and the first electrode
(Continued)

terminal. The current collecting member includes a substrate and a support plate, the substrate being provided at a side of the main body portion along a transverse direction, the support plate extending from an end part of the substrate in a longitudinal direction, and the first tab being connected to the support plate.

9 Claims, 7 Drawing Sheets

(58) Field of Classification Search
USPC .......................................................... 429/163
See application file for complete search history.

(56) References Cited

U.S. PATENT DOCUMENTS

| | | | |
|---|---|---|---|
| 9,178,205 | B2 | 11/2015 | Kim et al. |
| 2010/0233521 | A1 | 9/2010 | Byun et al. |
| 2011/0287309 | A1 | 11/2011 | Lee et al. |
| 2012/0171555 | A1 | 7/2012 | Heo et al. |
| 2013/0052520 | A1 | 2/2013 | Kim et al. |
| 2014/0141293 | A1* | 5/2014 | Urano ................. H01M 50/103 |
| | | | 429/56 |
| 2016/0285134 | A1* | 9/2016 | Sasaki ................. H01M 50/536 |
| 2019/0067667 | A1* | 2/2019 | Jang ....................... H01M 50/54 |

FOREIGN PATENT DOCUMENTS

| | | |
|---|---|---|
| CN | 207818736 U | 9/2018 |
| CN | 208014793 U | 10/2018 |
| CN | 209104251 U | 7/2019 |
| EP | 2228852 A1 | 9/2010 |
| EP | 2472642 A2 | 7/2012 |

OTHER PUBLICATIONS

Contemporary Amperex Technology Co., Limited, International Search Report and Written Opinion, PCT/CN2019/119736, dated Feb. 26, 2020, 16 pgs.
Contemporary Amperex Technology Co., Limited, Extended European Search Report, EP19886853.1, dated Oct. 19, 2021, 9 pgs.
Contemporary Amperex Technology Co., Communication Under Rule 71(3) EPC, Intention to Grant, dated Feb. 3, 2023, 32 pgs.

* cited by examiner

FIG. 15 ations on Nov. 20, 2019, which claims priority to Chinese Patent Application No. 201821940481.4, filed with the China National Intellectual Property Administration on Nov. 22, 2018 and entitled "SECONDARY BATTERY", both of which are incorporated herein by reference in their entirety.
CURRENT COLLECTING MEMBER, SECONDARY BATTERY AND FABRICATION METHOD

CROSS-REFERENCE TO RELATED APPLICATIONS

This application is a continuation application of PCT Patent Application No. PCT/CN2019/119736, entitled "CURRENT COLLECTING MEMBER, SECONDARY BATTERY AND FABRICATION METHOD" filed on Nov. 20, 2019, which claims priority to Chinese Patent Application No. 201821940481.4, filed with the China National Intellectual Property Administration on Nov. 22, 2018 and entitled "SECONDARY BATTERY", both of which are incorporated herein by reference in their entirety.

TECHNICAL FIELD

This application relates to the field of batteries, and in particular, to a current collecting member, a secondary battery, and a fabrication method.

BACKGROUND

An electrode assembly is a core part of a secondary battery for implementing charging and discharging functions, and tabs of the electrode assembly are electrically connected to electrode terminals through current collecting members. In order to save space, a current collecting member is apart from an end part of an electrode assembly by a small distance. When the electrode assembly is subject to thermal runaway, a large amount of gas is generated inside the electrode assembly, and when the gas is discharged from the end part of the electrode assembly, the gas is blocked by the current collecting members. As a result, the gas cannot be discharged in a timely manner, causing potential safety hazards.

SUMMARY

In view of the problems existing in the background art, the purpose of this application is to provide a current collecting member, a secondary battery, and a fabrication method, which can discharge gas generated by an electrode assembly in a timely manner, to avoid cracking of a housing and improve the safety performance of the secondary battery.

In order to achieve the above purpose, this application provides a current collecting member of a secondary battery, where the current collecting member is configured to connect a first tab of the electrode assembly of the secondary battery and a first electrode terminal of a top cover assembly, where the electrode assembly includes a main body portion;
  the current collecting member includes a substrate and a support plate, the support plate being connected to the first tab and the substrate; and
  the substrate is provided with a channel, where the channel is configured to place an end surface of the main body portion in communication with space on a side of the substrate facing away from the main body portion.
Further, two support plates are provided and respectively connected to two ends of the substrate; and
  the two support plates are located on a same side of the substrate in a thickness direction of the substrate and extend in the directions approaching each other, where a gap is reserved between the two support plates.

Further, the channel includes a through hole running through the substrate, and the through hole at least partially overlaps the gap in the thickness direction of the substrate.
Further, the channel includes a groove made into the substrate, where the groove is recessed from one surface of the substrate to the other surface of the substrate, and one end of the groove extends to an edge of the substrate.
Further, a depth of the groove is 0.5 cm to 2 cm.
Further, the groove is formed by stamping the surface of the substrate on one side, where a bulge is formed on the other side of the substrate; and
  the bulge extends to the interior of the gap.
Further, the channel further includes a through hole, the through hole being formed in the bulge and in communication with the groove.
In order to achieve the above purpose, this application provides a secondary battery, including an electrode assembly, a housing, a top cover assembly and the current collecting members;
  the top cover assembly includes a top cover plate and a first electrode terminal that is disposed on the top cover plate, the top cover plate being connected to the housing;
  the electrode assembly is accommodated in the housing, where one end of the main body portion protrudes from the substrate along a direction leaving the top cover plate, and the first tab extends from one end of the main body portion along a transverse direction (X); and
  one end of the main body portion protrudes from one end of the substrate of the current collecting member along the direction leaving the top cover plate.
Further, the channel includes a groove made into the substrate, the groove extending to an end of the substrate facing away from the top cover plate.
Further, a distance between an inner surface of the substrate and the main body portion is 0 mm to 5 mm.
In order to achieve the above purpose, this application provides a fabrication method of a secondary battery, including:
  placing a top cover plate at a predetermined assembly location, and installing electrode terminals on the top cover plate;
  assembling current collecting members, and connecting the current collecting members to the electrode terminals of the top cover plate;
  assembling an electrode assembly, and connecting the electrode terminals to tabs of the electrode assembly so that a channel is formed between a main body portion and a substrate; and
  assembling the secondary battery by placing the electrode assembly into a housing, and welding the top cover assembly to the housing.

This application has the following beneficial effects: In this application, gas generated by the electrode assembly can be discharged in a timely manner, reducing potential safety hazards. In addition, the impact force of the generated gas is reduced by arranging the channel, avoiding cracking of the housing and improving the safety performance of the secondary battery.

DESCRIPTION OF REFERENCE SIGNS

| | |
|---|---|
| 1. | electrode assembly |
| 11. | main body portion |
| 111. | end surface |
| 12. | first tab |
| 13. | second tab |
| 14. | first electrode plate |
| 141. | first current collector |
| 142. | first active material layer |
| 15. | second electrode plate |
| 16. | separator |
| 2. | housing |
| 3. | top cover assembly |
| 31. | top cover plate |
| 32. | first electrode terminal |
| 33. | second electrode terminal |
| 4. | current collecting member |
| 41. | substrate |
| 411. | through hole |
| 412. | groove |
| 413. | bulge |
| 42. | support plate |
| 43. | terminal connecting plate |
| G. | gap |
| X. | transverse direction |
| Y. | longitudinal direction |
| Z. | height direction |

DESCRIPTION OF EMBODIMENTS

The following clearly describes the technical solutions in the embodiments of this application with reference to the accompanying drawings in the embodiments of this application. Apparently, the described embodiments are only a part rather than all of the embodiments of this application. The following description of at least one example embodiment is merely illustrative and definitely is not construed as any limitation on this application and use of this application. All other embodiments obtained by a person of ordinary skill in the art based on the embodiments of this application without creative efforts shall fall within the protection scope of this application.

In the description of this application, it should be understood that the use of words "first", "second", and the like to define parts is merely intended to distinguish between the respective parts, and unless otherwise specified, the words have no special meaning and therefore are not construed as any limitation on the protection scope of this application. A secondary battery in this application may be a lithium-ion battery.

Figure 1:
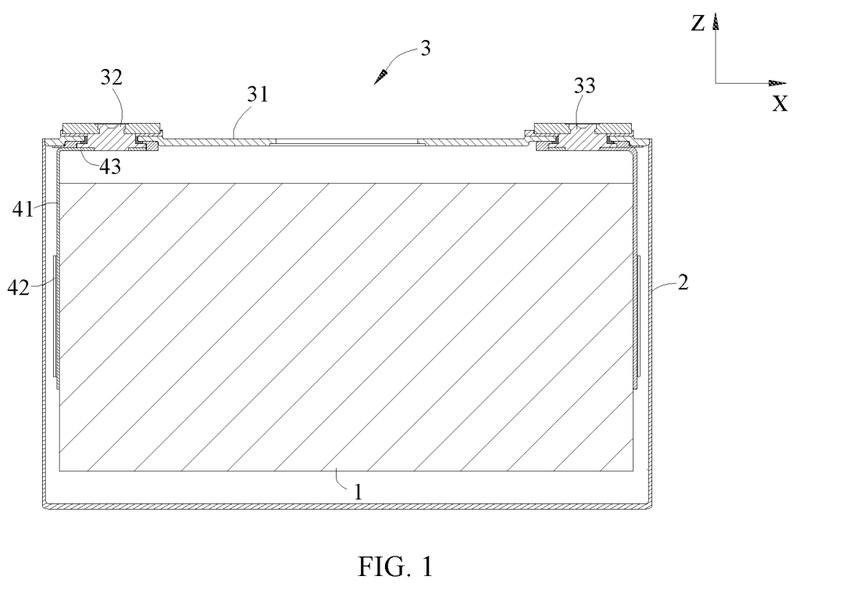
FIG. 1 is a schematic diagram of a secondary battery according to this application.

Referring to FIG. 1, in a first embodiment, the secondary battery in this application includes an electrode assembly 1, a housing 2, a top cover assembly 3, and current collecting members 4.

The housing 2 may be of a hexahedron shape or another shape. An accommodating cavity is formed in the interior of the housing 2 so as to accommodate the electrode assembly 1 and an electrolyte. An opening is formed in the housing 2 at one end, and the electrode assembly 1 can be placed into the accommodating cavity of the housing 2 through the opening. The housing 2 may be made of a material of an electrically conductive metal, preferably aluminum or an aluminum alloy.

The top cover assembly 3 includes a top cover plate 31, a first electrode terminal 32 and a second electrode terminal 33, the first electrode terminal 32 and the second electrode terminal 33 being arranged on the top cover plate 31. The top cover plate 31 is disposed on the housing 2 and covers the opening of the housing 2, thereby enclosing the electrode assembly 1 within the housing 2. The top cover plate 31 may be connected to the housing 2 through welding.

Figure 2:
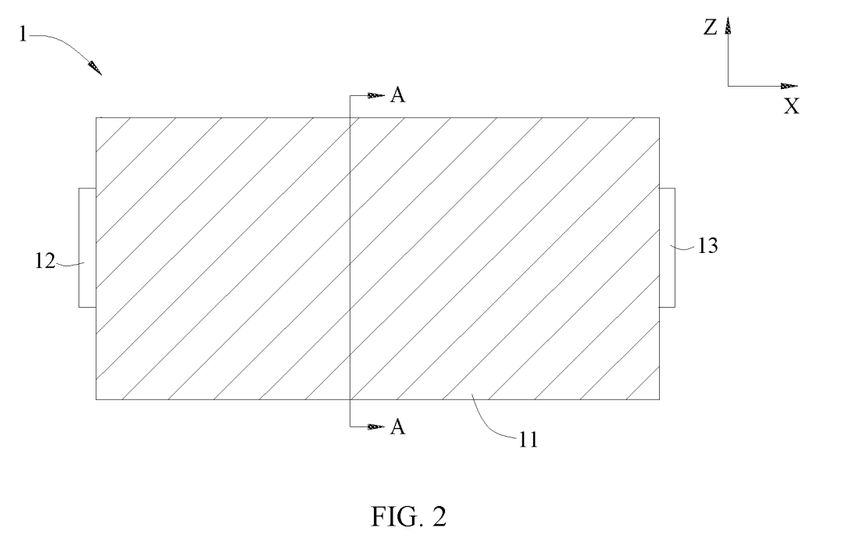
FIG. 2 is a schematic diagram of an electrode assembly in FIG. 1.
Figure 3:
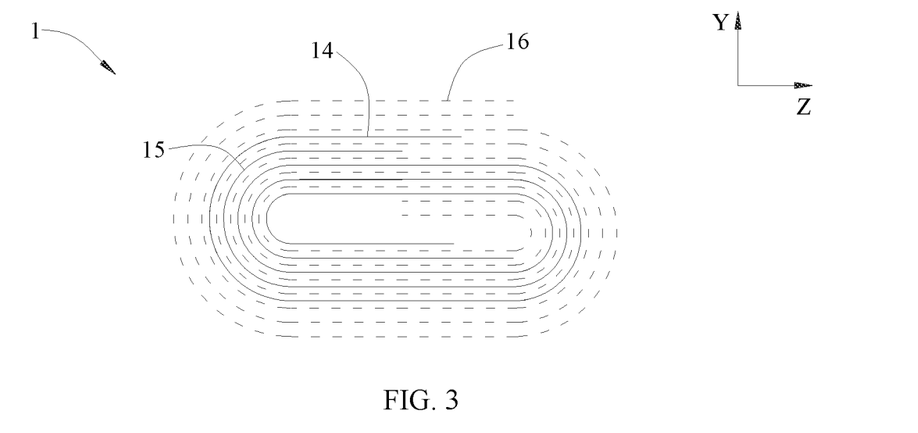
FIG. 3 is a sectional view of FIG. 2 taken along line A-A.

Referring to FIG. 2 and FIG. 3, the electrode assembly 1 includes a first electrode plate 14, a second electrode plate 15 and a separator 16, the separator 16 being arranged between the first electrode plate 14 and the second electrode plate 15. The electrode assembly 1 is formed by spirally winding the first electrode plate 14, the second electrode plate 15 and the separator 16, and is pressed by pressure to form a flat structure. The electrode assembly 1 is a core part of the secondary battery for implementing charging and discharging functions. The first electrode plate 14 is electrically connected to the first electrode terminal 32, and the second electrode plate 15 is electrically connected to the second electrode terminal 33.

Figure 4:
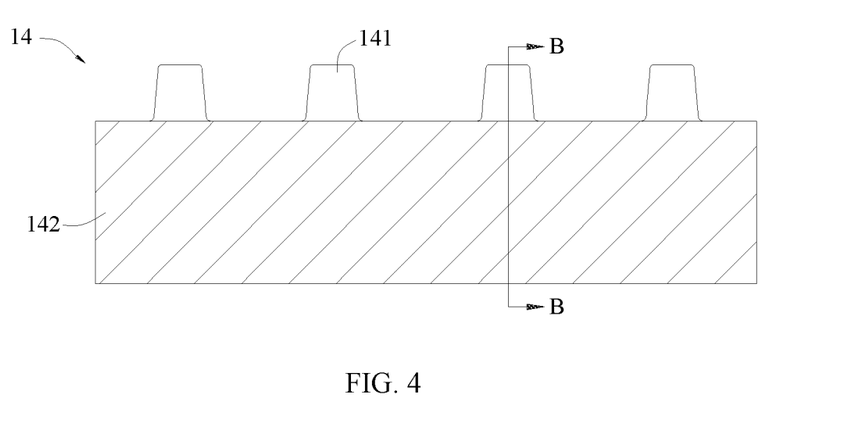
FIG. 4 is a schematic diagram of a first electrode plate of FIG. 3 in an expanded state.
Figure 5:
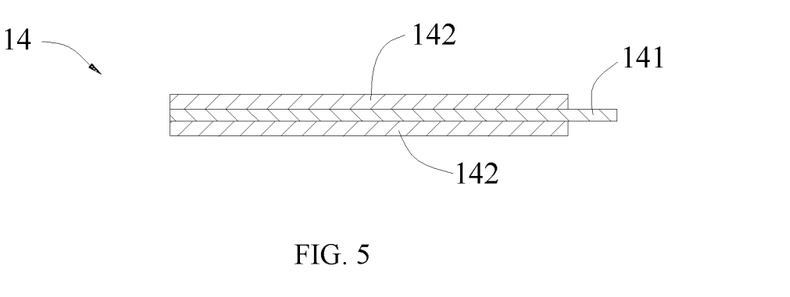
FIG. 5 is a sectional view of FIG. 4 taken along line B-B.

Referring to FIG. 4 and FIG. 5, the first electrode plate 14 includes a first current collector 141 and a first active material layer 142 coated on the surface of the first current collector 141. The first electrode plate 14 may be a positive electrode plate, the first current collector 141 is an aluminum foil, and the first active material layer 142 includes active materials such as lithium manganate and lithium iron phosphate. The active materials (such as lithium manganate and lithium iron phosphate), a binder, a conductive agent and a solvent could be made into slurry, and then the slurry was applied to two surfaces of the first current collector 141, and the first active material layer 142 was formed after the slurry was cured.

Only partial regions of the first current collector 141 are coated with the first active material layer 142. The first active material layer 142 and the region of the first current collector 141 coated with the first active material layer 142 form a first coated region of the first electrode plate 14, and regions of the first current collector 141 without being coated with the first active material layer 142 form first uncoated regions. Referring to FIG. 4, a plurality of first uncoated regions are provided and arranged at intervals.

Similarly, the second electrode plate 15 includes a second current collector and a second active material layer coated on the surface of the second current collector. The second electrode plate 15 may be a negative electrode plate, the second current collector is a copper foil, and the second active material layer includes active materials such as graphite or silicon.

Only partial regions of the second current collector are coated with the second active material layer. The second active material layer and the region of the second current collector coated with the first active material layer form a second coated region of the second electrode plate, and regions of the second current collector without being coated with the second active material layer form second uncoated regions. A plurality of second uncoated regions are provided and arranged at intervals.

When the first electrode plate 14, the second electrode plate 15, and the separator 16 are wound for formation, the first coated region, the separator 16 and the second coated region form a main body portion 11 of the electrode assembly 1, the plurality of first uncoated regions are stacked together and form a first tab 12 of the electrode assembly 1, and the plurality of second uncoated regions are stacked together and form a second tab 13 of the electrode assembly 1. The first tab 12 and the second tab 13 are respectively located at two ends of the main body portion 11 along the transverse direction X.

In order to completely separate the first coated region and the second coated region, a width of the separator 13 in the transverse direction X is greater than that of the first coated region in the transverse direction X and that of the second coated region in the transverse direction X. In other words, the two ends of the separator 13 in the transverse direction X exceeds the first coated region and the second coated region. After the separator 13 is wound for formation, one end of the separator 13 close to the first tab 12 approximately forms a surface, namely an end surface 111 of the main body portion 11.

After formation, gaps are reserved between all layers of the separator 13; and when gas is generated in the electrode assembly 11, the gas is discharged from the end surface 111. In addition, the electrolyte also enters the interior of the electrode assembly 1 from the end surface 111.

The current collecting member 4 is connected to the first tab 12 and the first electrode terminal 32. Specifically, referring to FIG. 1 and FIG. 6, the current collecting member 4 includes a substrate 41, support plates 42 and a terminal connecting plate 43, the terminal connecting plate 43 can be fixed to the first electrode terminal 32 by welding, and the substrate 41 is bent downward from one end of the terminal connecting plate 43. The substrate 41 is arranged on one side of the main body portion 11 in the transverse direction X and is substantially perpendicular to the transverse direction X. The support plate 42 extends from the substrate 41 along an end portion in the longitudinal direction Y and is bent back to a side of the substrate 41 facing away from the main body portion 11. The current collecting member 4 is an integrally formed metal member.

The substrate 41 is preferably arranged close to the end surface 111 of the main body portion 11, so that the space occupied by the substrate 41 and the main body portion 11 in the transverse direction X can be reduced, and the space utilization is improved.

One end of the main body portion 11 protrudes from an end of the substrate 41 along a direction leaving the top cover plate 31. In other words, in a height direction Z, the lower end of the main body portion 11 is higher than the lower end of the substrate 41; and a region of the end surface 111 located under the substrate 41 is not covered by the substrate 41.

The secondary battery generates trace gas in the normal working process. If the end surface 111 is completely shielded by the substrate 41, the gas cannot be discharged from the electrode assembly 1 in a timely manner, and the gas gathered in the electrode assembly 1 can increase the gap between the first electrode plate 14 and the second electrode plate 15, which affects the performance of the electrode assembly 1. However, in this application, the gas can be discharged from a region of the end surface 111 not covered by the substrate 41, so that gathering of the gas is reduced. The electrolyte can also enter the interior of the electrode assembly 1 from the region of the end surface 111 not covered by the substrate 41.

When thermal runaway occurs in the secondary battery, a large amount of gas is generated inside the electrode assembly 1. If the end surface 111 is completely shielded by the substrate 41, the gas cannot be discharged from the electrode assembly 1 in a timely manner, causing a potential safety hazard. However, in this application, the gas can be discharged from the region of the end surface 111 not covered by the substrate 41, so that the gas discharge efficiency is improved.

However, when thermal runaway occurs in the secondary battery, the temperature and pressure of the gas discharged from the electrode assembly 1 are high, and the gas directly impacts the housing 2; and the housing 2 is prone to soften under the action of high temperature. If gas can only be discharged from the region, located under the substrate 41, of the end surface 111, the impact area of the housing 2 is small, the impact force is large, and therefore the housing 2 is prone to crack under the action of the gas, causing potential safety hazards.

In this application, to avoid cracking of the housing 2, a channel 410 is preferably arranged in the substrate 41, and the channel 410 places the end surface 111 of the main body portion 11 in communication with space on the side of the substrate 41 facing away from the main body portion 111. The channel 410 adds lines for discharging gas, which can reduce the impact force of high-temperature gas, and avoid cracking of the housing 2.

In addition, the electrolyte can also enter the interior of the electrode assembly 1 through the channel 410, achieving better infiltration.

In conclusion, in this application, gas generated by the electrode assembly 1 can be discharged in a timely manner, reducing potential safety hazards. In addition, the impact force of the generated gas is reduced by arranging the channel 410, avoiding cracking of the housing 2 and improving the safety performance of the secondary battery.

In order to improve the space utilization, a distance between the substrate 41 and the main body portion 11 should be minimized. Specifically, a distance between an inner surface of the substrate 41 and the main body portion 11 is 0 mm to 5 mm. Preferably, the inner surface of the substrate 41 can be directly attached to the end surface 111 of the main body portion 11, so that the space utilization is maximized.

Certainly, because the distance between the inner surface of the substrate 41 and the main body portion 11 is small, the substrate 41 blocks the gas discharged from the electrode assembly 1. However, in this application, the substrate 41 is provided with a channel 410 through which gas can be discharged, so that gas in the electrode assembly 1 can be discharged even if the inner surface of the substrate 41 is directly attached to the end surface 111 of the main body portion 11.

A plurality of electrode assemblies 1 are generally provided, to increase the capacity of the secondary battery. The plurality of electrode assemblies 1 may include a first electrode assembly and a second electrode assembly.

Figure 6:
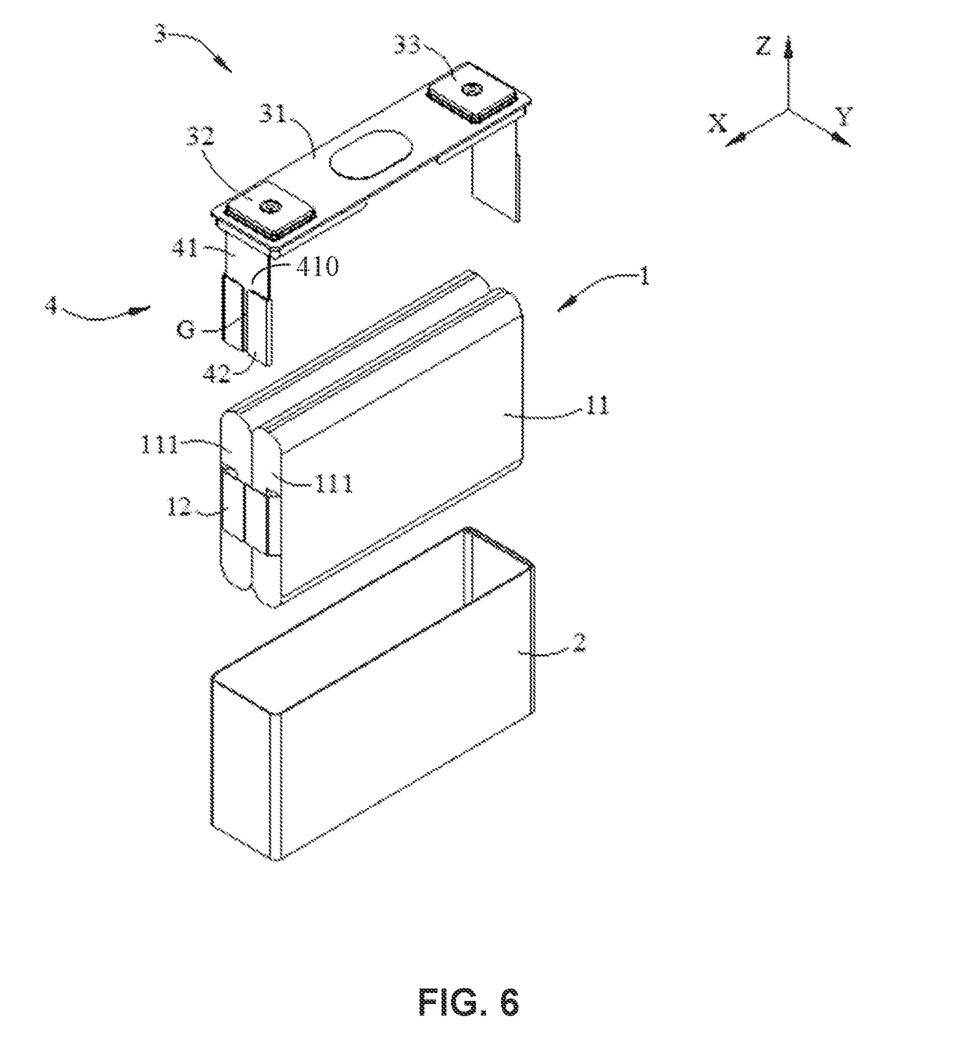
FIG. 6 is an exploded view of a secondary battery according to this application.
Figure 7:
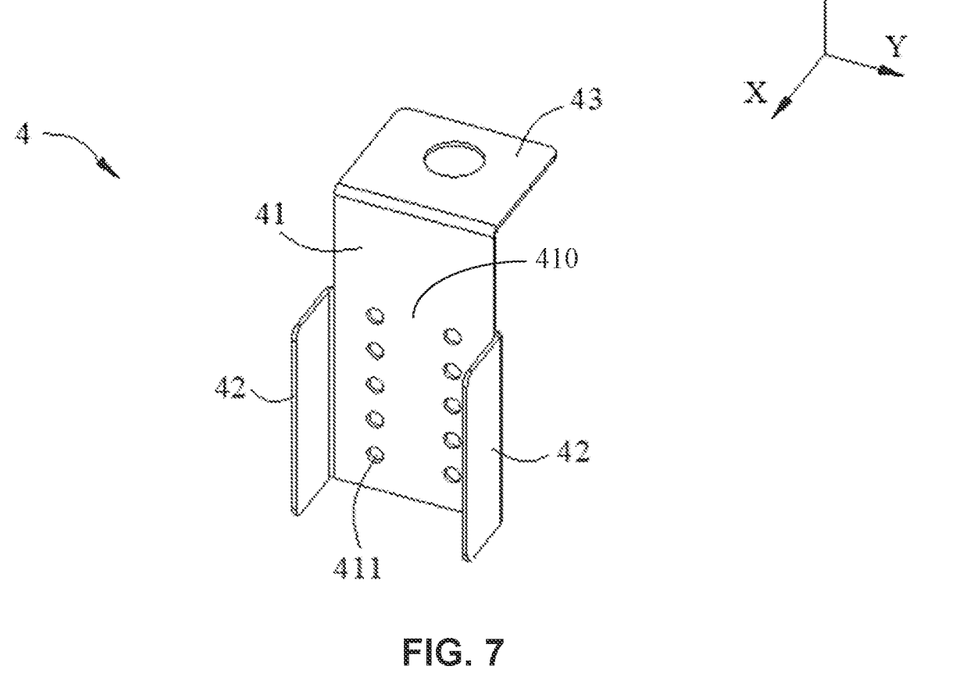
FIG. 7 is a schematic diagram of a current collecting member of a first embodiment before formation.

Two support plates 42 are provided and extend from the substrate 41 along the two ends of the longitudinal direction Y respectively. Referring to FIG. 7, initially, the two support plates 42 may be perpendicular to the substrate 41, the first tab 12 of the first electrode assembly may be welded to one support plate 42, and the first tab 12 of the second electrode assembly may be welded to the other support plate 42. Referring to FIG. 6, when welding is completed, the two support plates 42 are bent in the directions approaching each other, so that the two support plates 42 are parallel to the substrate 41. Bending the support plates 42 can reduce the space occupied by the current collecting member 4 in the transverse direction X, and increase the energy density.

In the longitudinal direction Y, a gap G is reserved between the two support plates 42, preventing the two support plates 42 from overlapping each other when being bent.

Referring to FIG. 7, the channel 410 includes a through hole 411. The gas generated inside the electrode assembly 1 can be directly discharged through the through hole 411, preventing the generated gas from gathering inside the electrode assembly 1, and improving the safety performance of the secondary battery.

The through hole 411 may be a circular hole, a square hole, or a hole in any other shape. Preferably, a plurality of through holes 411 are provided and arranged in parallel. The plurality of through holes 411 may provide a plurality of lines for discharging gas in time.

A ratio of the area of the through hole 411 to the area of the portion of the end surface 111 that is shielded by the substrate 41 is ⅕ to ⅓. If the area ratio is less than ⅕, the gas discharge efficiency is low, the impact force of the high-temperature gas is large, and there is still a risk of cracking the housing 2. If the area ratio is greater than ⅓, the overcurrent capability of the substrate 41 is insufficient, partial regions are overheat, and the performance of the secondary battery is affected.

Other embodiments of the current collecting member of this application are described below. For simplicity of description, the following mainly describes the differences between other embodiments and the first embodiment, and those not described may be understood with reference to the first embodiment.

Figure 8:
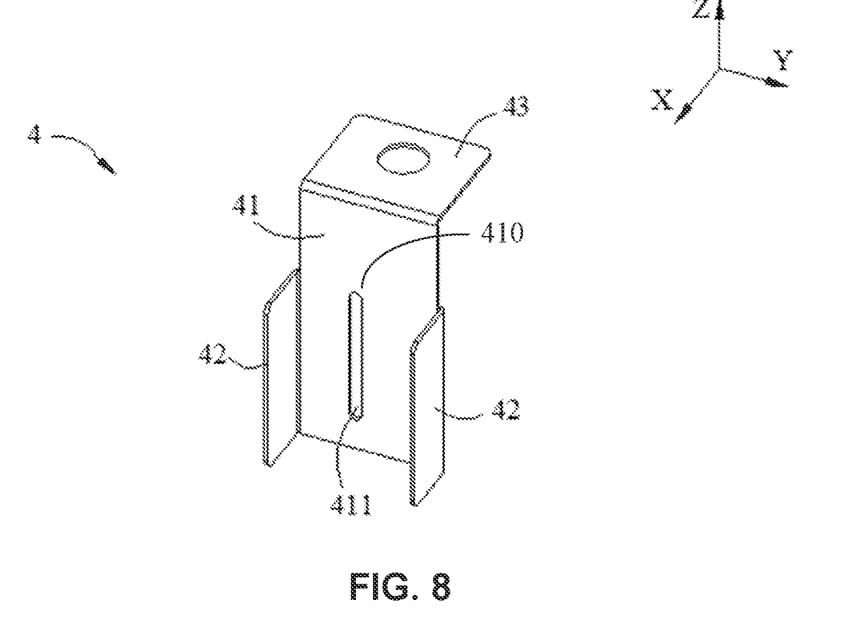
FIG. 8 is a schematic diagram of a current collecting member of a second embodiment before formation.
Figure 9:
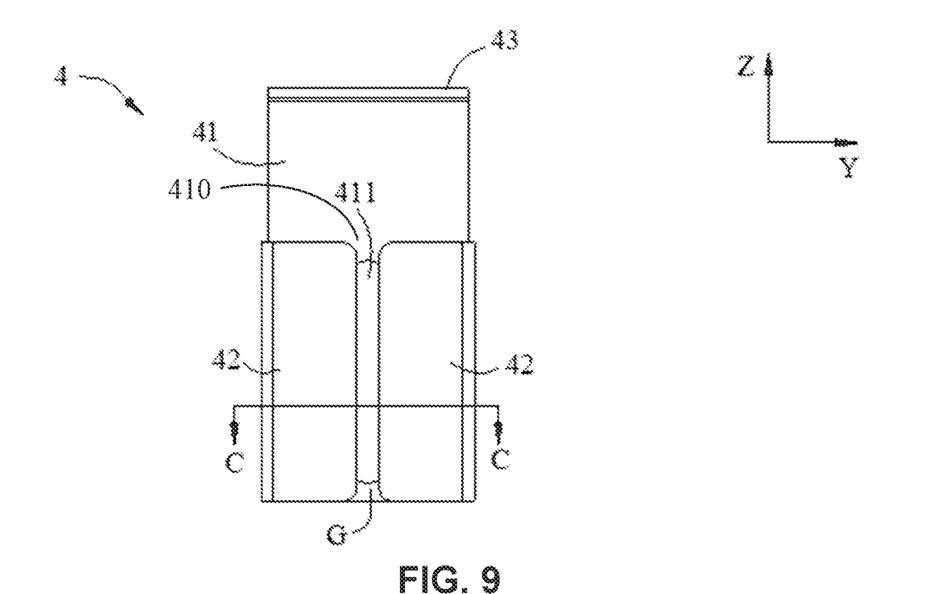
FIG. 9 is a schematic diagram of the current collecting member in FIG. 8 after formation.
Figure 10:
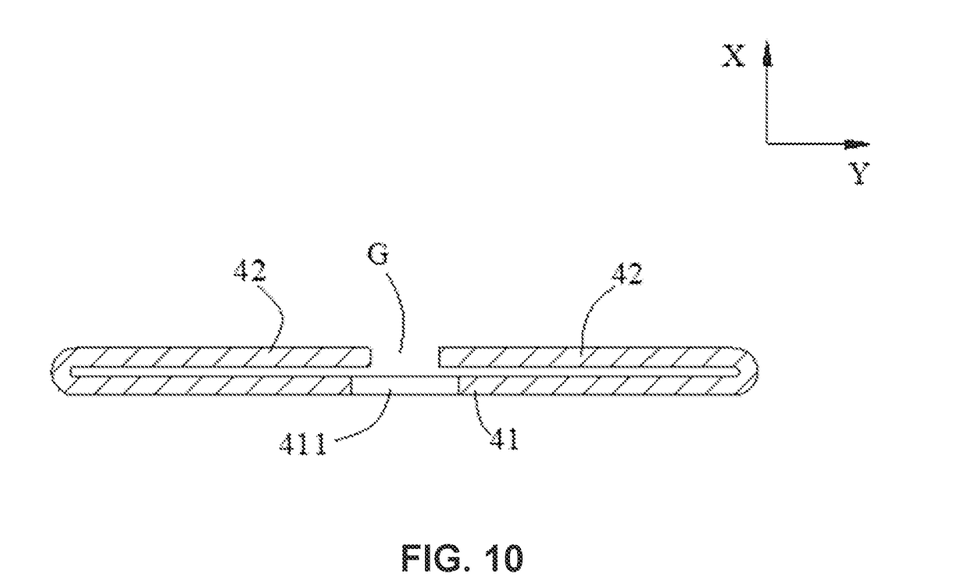
FIG. 10 is a sectional view of FIG. 9 taken along line C-C.

FIG. 8 is a schematic diagram of a current collecting member of a second embodiment before formation, FIG. 9 is a schematic diagram of the current collecting member in FIG. 8 after formation, and FIG. 10 is a sectional view of FIG. 9 taken along line C-C.

When thermal runaway occurs in the electrode assembly 1, the generated gas is ejected along the through hole 411. If the through hole 411 is covered by the support plate 42, the gas is blocked by the support plate 42 when being ejected, reducing the gas discharge efficiency. Therefore, referring to FIG. 8 to FIG. 10, in the second embodiment, the through hole 411 is preferably opposite to the gap G in the transverse direction X. In this case, the ejected gas can directly pass through the gap G, so that the gas discharge efficiency is improved.

In the longitudinal direction Y, a width of the gap G should be greater than or equal to 0.1 mm. If the gap G is too small, it is difficult for the gas to quickly pass through the gap G, leading to reduction of the gas discharge efficiency. The width of the through hole 411 should be greater than or equal to that of the gap G in the longitudinal direction Y. If the width of the through hole 411 is too small, it is also difficult for gas to pass through the through hole 411, leading to reduction of the gas discharge efficiency.

Preferably, the through hole 411 is a strip-shaped hole and is parallel to the gap G, so that the area of the through hole 411 overlapping the gap G can be maximized, and the gas discharge efficiency is improved.

Figure 11:
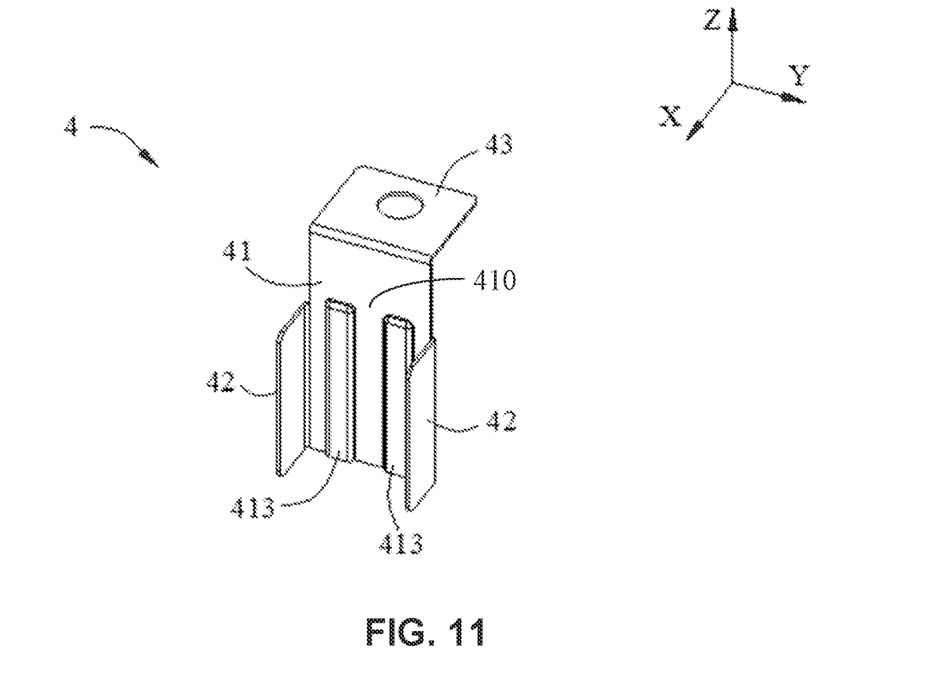
FIG. 11 is a schematic diagram of a current collecting member of a third embodiment before formation.
Figure 12:
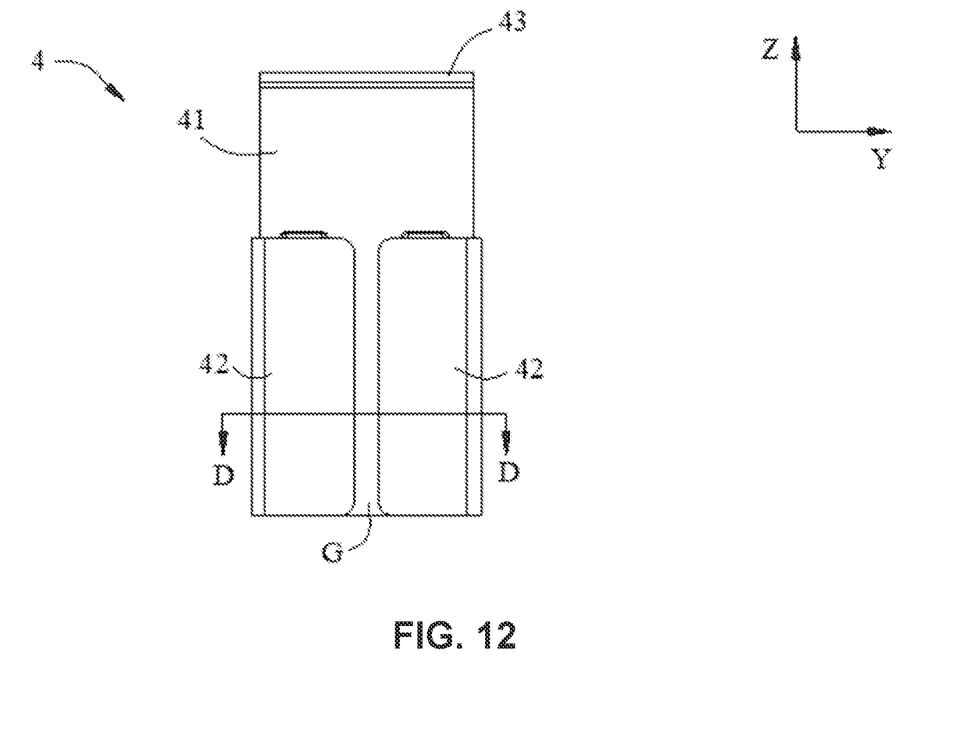
FIG. 12 is a schematic diagram of the current collecting member in FIG. 11 after formation.
Figure 13:
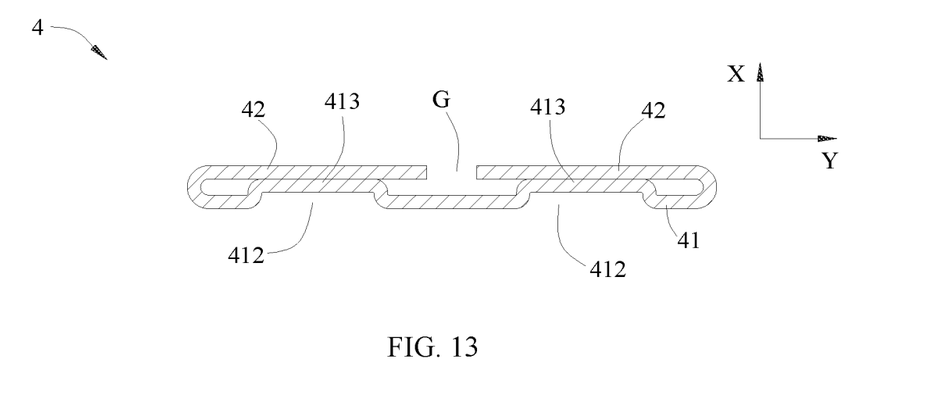
FIG. 13 is a sectional view of FIG. 12 taken along line D-D.

FIG. 11 is a schematic diagram of a current collecting member of a third embodiment before formation, FIG. 12 is a schematic diagram of the current collecting member in FIG. 11 after formation, and FIG. 13 is a sectional view of FIG. 12 taken along line D-D.

Referring to FIG. 11 to FIG. 13, compared with the first embodiment, the third embodiment replaces the through hole 411 with the groove 412.

Specifically, in the third embodiment, the channel 410 includes a groove 412 disposed in an inner surface of the substrate 41 close to the main body portion 11, and one end of the groove 412 extends to an edge of the substrate 41. The gas generated by the electrode assembly 1 can flow along the groove 412 to the outside of the electrode assembly 1 even if the inner surface of the substrate 41 is directly attached to the end surface 111 of the main body portion 11.

The groove 412 extends to an end of the substrate 41 facing away from the top cover plate 31. The groove 412 extends in the height direction Z, and the lower end of the groove 412 communicates with the space between the substrate 41 and the housing 2. The gas generated by the electrode assembly 1 can flow along the groove 412 and be discharged to a space under the substrate 41.

A depth of the groove 412 is 0.5 cm to 2 cm in the transverse direction X. If the depth of the groove 412 is smaller than 0.5 cm, the sectional area of the groove 412 is too small, and the gas discharge efficiency is low; if the depth of the groove 412 is greater than 2 cm, a thickness of the substrate 41 is too large, and the space occupied by the substrate 41 is increased.

A bulge 413 is formed on an outer surface of the substrate 41 facing away from the main body portion 11, and the groove 412 is formed on one side of the bulge 413 closer to the main body portion 11. The groove 412 may be formed in the inner surface of the substrate 41 by stamping the substrate 41, where the bulge 413 is formed on the outer surface of the substrate 41.

Figure 14:
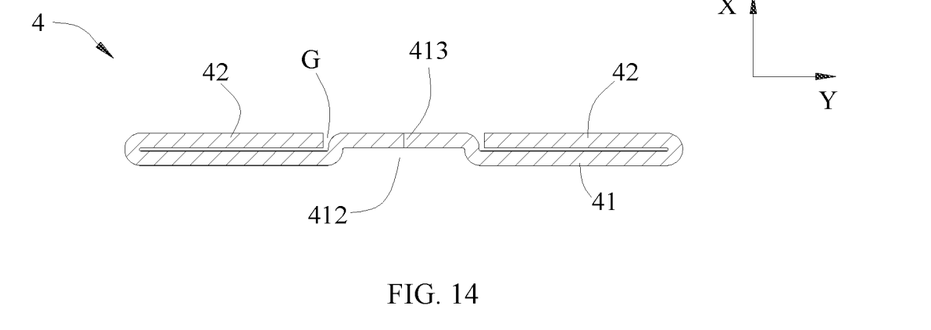
FIG. 14 is a schematic diagram of a current collecting member of a fourth embodiment.

FIG. 14 is a schematic diagram of a current collecting member of a fourth embodiment. Referring to FIG. 14, the difference between the fourth embodiment and the third embodiment lies in the position of the bulge 413.

Specifically, the bulge 413 extends to the interior of the gap G, that is, the bulge 413 is located between the two support plates 42 in the longitudinal direction Y. The space occupied by the bulge 413 overlaps with the space occupied by the support plates 42 in the transverse direction X, so that the overall space occupied by the current collecting member 4 is reduced, and the space utilization is increased.

Figure 15:
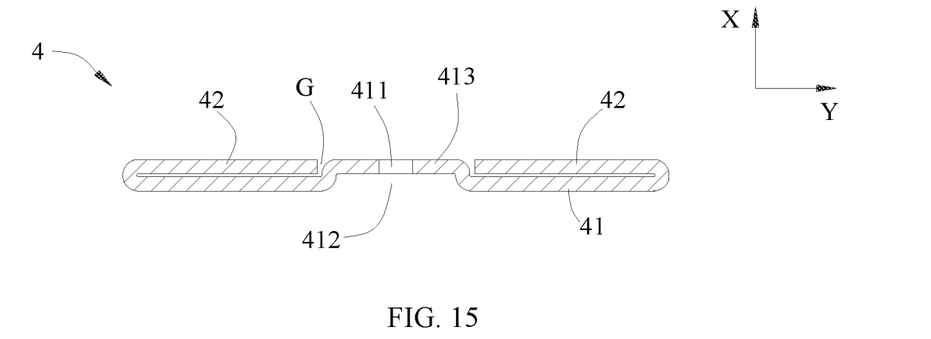
FIG. 15 is a schematic diagram of a current collecting member of a fifth embodiment.

FIG. 15 is a schematic diagram of a current collecting member of a fifth embodiment. Referring to FIG. 15, compared with the fourth embodiment, the channel in the fifth embodiment further includes a through hole 411, and the through hole 411 is arranged on the bulge 413 and communicates with the groove 412.

When the electrode assembly 1 generates gas, the gas can be discharged along both the groove 412 and the through hole 411, which further improves the gas discharge efficiency.

In a sixth embodiment, a fabrication method of a secondary battery in this application includes:
- placing a top cover plate 31 at a predetermined assembly location, and installing electrode terminals on the top cover plate 31;
- assembling current collecting members 4, and connecting a terminal connecting plate 43 to the current collecting members 4 to the electrode terminals of the top cover plate 3;
- assembling an electrode assembly 1, and connecting the electrode terminals to tabs of the electrode assembly 1 so that a channel is formed between a main body portion 11 and a substrate 41; and
- assembling the secondary battery by placing the electrode assembly 1 into a housing 2, and welding the top cover assembly 3 to the housing 2, so as to fabricate the secondary battery.

What is claimed is:

1. A current collecting member of a secondary battery, wherein the current collecting member is configured to connect a first tab of an electrode assembly of the secondary battery to a first electrode terminal of a top cover assembly of the secondary battery, wherein the electrode assembly comprises a main body portion;
   the current collecting member comprises a substrate and two support plates, wherein the substrate is arranged on an end surface of the main body portion, the two support plates are respectively connected to two ends of the substrate and located on a side of the substrate facing away from the main body portion, and the two support plates extend in the direction approaching each other and are parallel with the substrate;
   a gap is disposed between the two support plates;
   the substrate is provided with a channel, wherein the channel is configured to place an end surface of the main body portion in communication with space on a side of the substrate facing away from the main body portion, the channel comprises a plurality of through holes through the substrate and overlapping the gap in the thickness direction of the substrate, the plurality of through holes are configured to allow gas generated inside the electrode assembly to discharge through the plurality of through holes; and
   the channel includes a groove disposed in an inner surface of the substrate close to the end surface of the main body portion, wherein the groove extends to an edge of the substrate.

2. The current collecting member according to claim 1, wherein the groove is recessed from one surface of the substrate to the other surface of the substrate.

3. The current collecting member according to claim 1, wherein one end of the groove extends to an edge of the substrate.

4. The current collecting member according to claim 1, wherein a depth of the groove is 0.5 cm to 2 cm.

5. The current collecting member according to claim 1, wherein a bulge is formed on an outer surface of the substrate facing away from the main body portion, and the groove is formed on one side of the bulge closer to the main body portion.

6. The current collecting member according to claim 5, wherein the groove is formed by stamping the surface of the substrate on one side, wherein the bulge is formed on the other side of the substrate.

7. The current collecting member according to claim 5, wherein the bulge extends to the interior of the gap.

8. The current collecting member according to claim 7, wherein at least one of the plurality of the through holes is formed in the bulge and in communication with the groove.

9. A secondary battery, comprising an electrode assembly, a housing, a top cover assembly and current collecting members according to claim 1.

* * * * *